US008098041B2

(12) United States Patent
Kokotovich et al.

(10) Patent No.: US 8,098,041 B2
(45) Date of Patent: Jan. 17, 2012

(54) METHOD OF CHARGING A POWERTRAIN

(75) Inventors: Nicholas Kokotovich, Troy, MI (US); Aniket Kothari, Southfield, MI (US); Michael Bolton, Battle Creek, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellshaft, Munich (DE)

( * ) Notice: Subject to any disclaimer, the term of this patent is extended or adjusted under 35 U.S.C. 154(b) by 578 days.

(21) Appl. No.: 12/253,225

(22) Filed: Oct. 16, 2008

(65) Prior Publication Data

US 2009/0115373 A1 May 7, 2009

Related U.S. Application Data

(60) Provisional application No. 60/985,270, filed on Nov. 4, 2007.

(51) Int. Cl.
*H02J 7/00* (2006.01)

(52) U.S. Cl. .................. 320/107; 320/104; 320/109

(58) Field of Classification Search ............ 320/107
See application file for complete search history.

(56) References Cited

U.S. PATENT DOCUMENTS

| | | | |
|---|---|---|---|
| 5,686,812 A * | 11/1997 | Hotta .......................... | 320/134 |
| 5,717,310 A * | 2/1998 | Sakai et al. ................... | 307/10.1 |
| 5,952,813 A * | 9/1999 | Ochiai ......................... | 320/104 |
| 6,727,676 B2 * | 4/2004 | Ochiai ......................... | 320/104 |
| 6,791,295 B1 * | 9/2004 | Berels ........................ | 320/103 |
| 6,832,148 B1 | 12/2004 | Bennett | |
| 6,868,318 B1 | 3/2005 | Cawthorne | |
| 7,154,236 B1 | 12/2006 | Heap | |
| 7,199,551 B2 * | 4/2007 | Gauthier et al. .............. | 320/104 |
| 7,786,702 B1 * | 8/2010 | Chait et al. ................... | 320/145 |
| 7,839,116 B2 * | 11/2010 | Esaka et al. .................. | 320/103 |
| 7,859,219 B2 * | 12/2010 | Harris ........................ | 320/104 |
| 7,872,443 B2 * | 1/2011 | Ward .......................... | 320/104 |
| 2001/0034577 A1 * | 10/2001 | Grounds et al. .............. | 701/207 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |

(Continued)

*Primary Examiner* — Arun Williams

(57) ABSTRACT

A method of charging a powertrain includes detecting an external power source in electrical communication with the powertrain, establishing a virtual network between charging control module, and transferring charge from the external power source to the powertrain.

18 Claims, 4 Drawing Sheets

U.S. PATENT DOCUMENTS

| | | |
|---|---|---|
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |

| | | |
|---|---|---|
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2009/0255493 A1 * | 10/2009 | Ichimoto .................... 123/90.11 |

* cited by examiner

METHOD OF CHARGING A POWERTRAIN

CROSS REFERENCE TO RELATED APPLICATIONS

This application claims the benefit of U.S. Provisional Application No. 60/985,270 filed on Nov. 4, 2007, which is hereby incorporated herein by reference.

TECHNICAL FIELD

This disclosure is related to battery charging in hybrid powertrains.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method of charging a powertrain includes detecting an external power source in electrical communication with the powertrain, establishing a virtual network between charging control module, and transferring charge from the external power source to the powertrain.

BRIEF DESCRIPTION OF THE DRAWINGS

One or more embodiments will now be described, by way of example, with reference to the accompanying drawings, in which.

DETAILED DESCRIPTION

Figure 1:
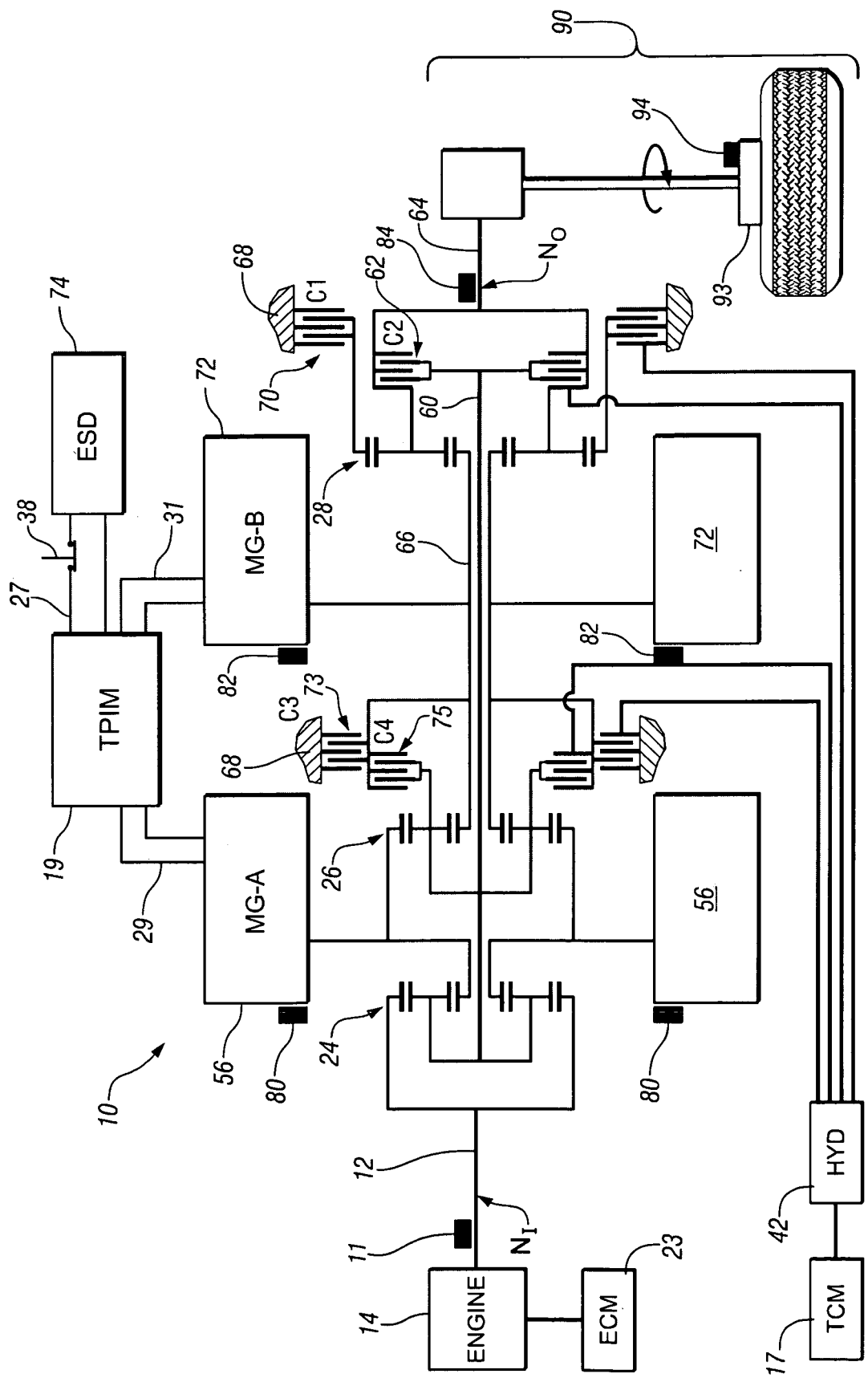
FIG. 1 is a schematic diagram of an exemplary powertrain, in accordance with the present disclosure.
Figure 2:
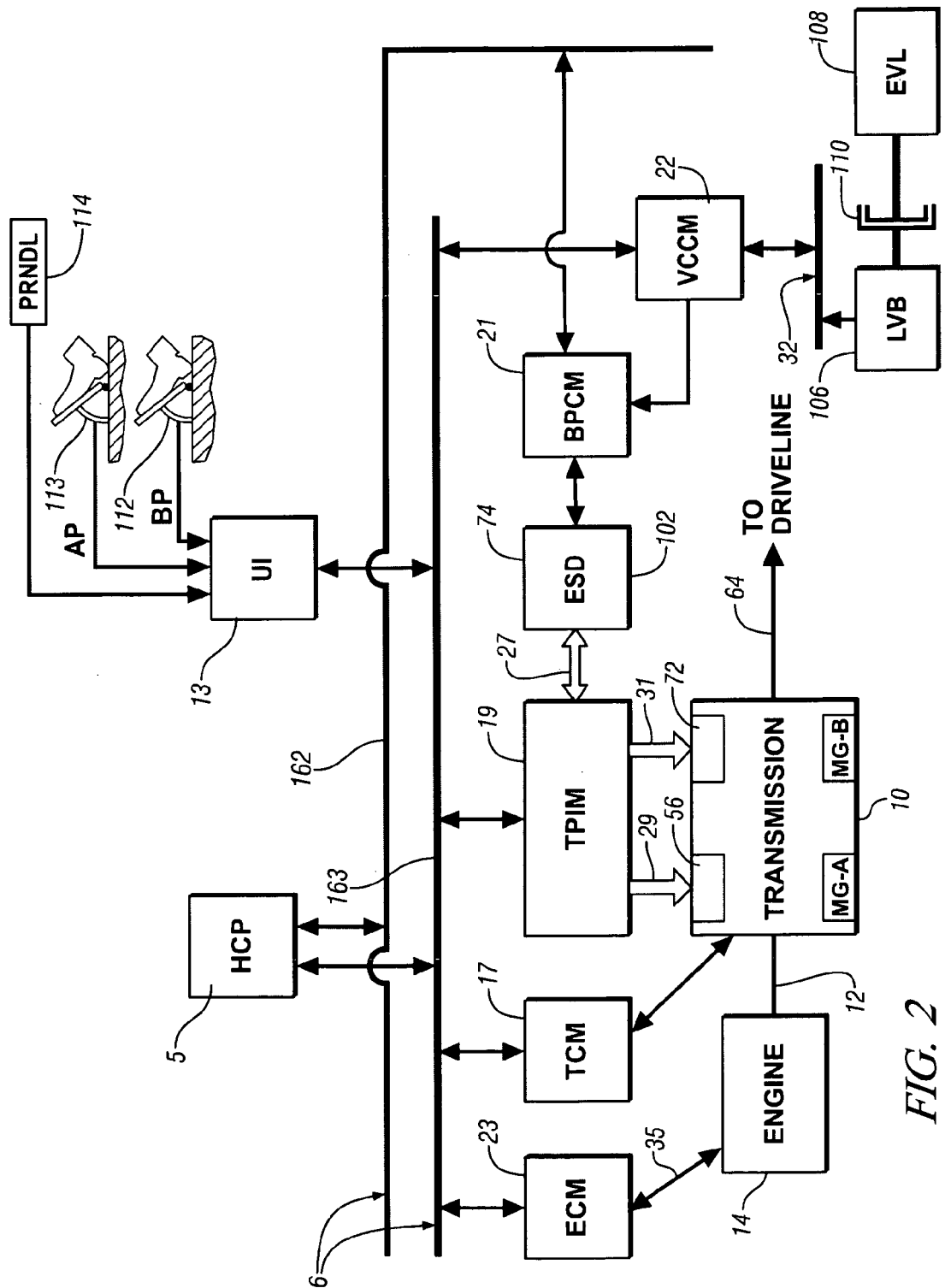
FIG. 2 is a schematic diagram of an exemplary architecture for a distributed control module system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electromechanical hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus includes a vehicle LAN bus 162 and a hybrid LAN bus 163.

The hybrid LAN bus 163 and the vehicle LAN bus 162 allow for structured communication of states of operating parameters and actuator command signals between the various control modules. The specific communication protocol utilized is application-specific. The hybrid LAN bus 163 and the vehicle LAN bus 162 and appropriate protocols provide for robust messaging and multi-control module interfacing between the aforementioned control modules, and other control modules providing functionality such as antilock braking, traction control, and vehicle stability. Additional communications buses may be used in addition to LAN buses 163 and 162 to improve communications speed and provide some level of signal redundancy and integrity. Communication between individual control modules can also be effected using a direct link, e.g., a serial peripheral interface ('SPI') bus (not shown).

The HCP 5 provides supervisory control and coordination of the ECM 23, the TCM 17, the BPCM 21, and the TPIM 19. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35.

The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

A voltage conversion control module (hereafter 'VCCM') 22 is electrically coupled to a high voltage battery 102 of the ESD 74 and the low voltage battery 106. The VCCM 22 monitors the voltage levels of the high voltage battery 102 and the low voltage bus 32 and controls voltage levels of the high voltage battery 102 and a low voltage bus 32 by providing voltage conversion, that is power transfer between the high voltage battery 102 and low voltage bus 32 at their respective voltages. Further, the VCCM 22 monitors and provides voltage conversion from the high voltage battery 102 to an intermediate voltage bus (not shown).

Each of the control modules ECM 23, TCM 17, TPIM 19, BPCM 21, and the VCCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the hybrid LAN bus 163 and the vehicle LAN bus 162 and SPI buses (not shown). The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

A charging subsystem of the distributed control module system includes the ESD 74 (including the high voltage battery 102), the BPCM 21, the ECDM 23, the HCP 5, the VCCM 22, the low voltage bus 32, a low voltage battery 106, the vehicle LAN 162, and the hybrid LAN 163.

The high voltage battery 102 has a voltage in the range of 300 V and the high voltage battery 102 includes several cell modules (not shown). In one embodiment, each cell module includes several individual battery cells (not shown). The high voltage battery 102 transfers energy to and receives energy from electric machine 56 and 72 through the inverters of the TPIM 19.

The BPCM 21 is signally connected to sensors to monitor the high voltage battery 102, including states of electrical current and voltage parameters, to provide information indicative of parametric states of the battery to the HCP 5. The parametric states of the battery preferably include battery state-of-charge, battery voltage, battery temperature, and available battery power, referred to as a range $P_{BAT\_MIN}$ to $P_{BAT\_MAX}$.

The low voltage bus 32 supplies energy to low voltage components of the vehicle including vehicle accessories (for example, electronic actuators utilized in power windows and door locks, a climate control system, and an audio system). Further, the low voltage bus 32 is electrically connected to each of the control modules i.e., HCP 5, ECM 23, TCM 17, TPIM 19, and BPCM 21, and other control modules to provide low voltage power for operation of the control modules and other vehicle and powertrain devices. In one embodiment, the low voltage bus 32 is maintained at a nominal voltage of between 12 V and 14 V. The low voltage battery 106 and the VCCM 22 maintain and the voltage across the low voltage bus 32.

An external low voltage power source (hereafter 'ELV') 108 provides power that is transferred through the low voltage battery 106 and is used to charge the high voltage battery 102. In one embodiment, the ELV 108 includes connection cables 110 that are configured to detachably electrically couple the ELV 108 to positive and negative terminals of the low voltage battery 106.

Figure 3:
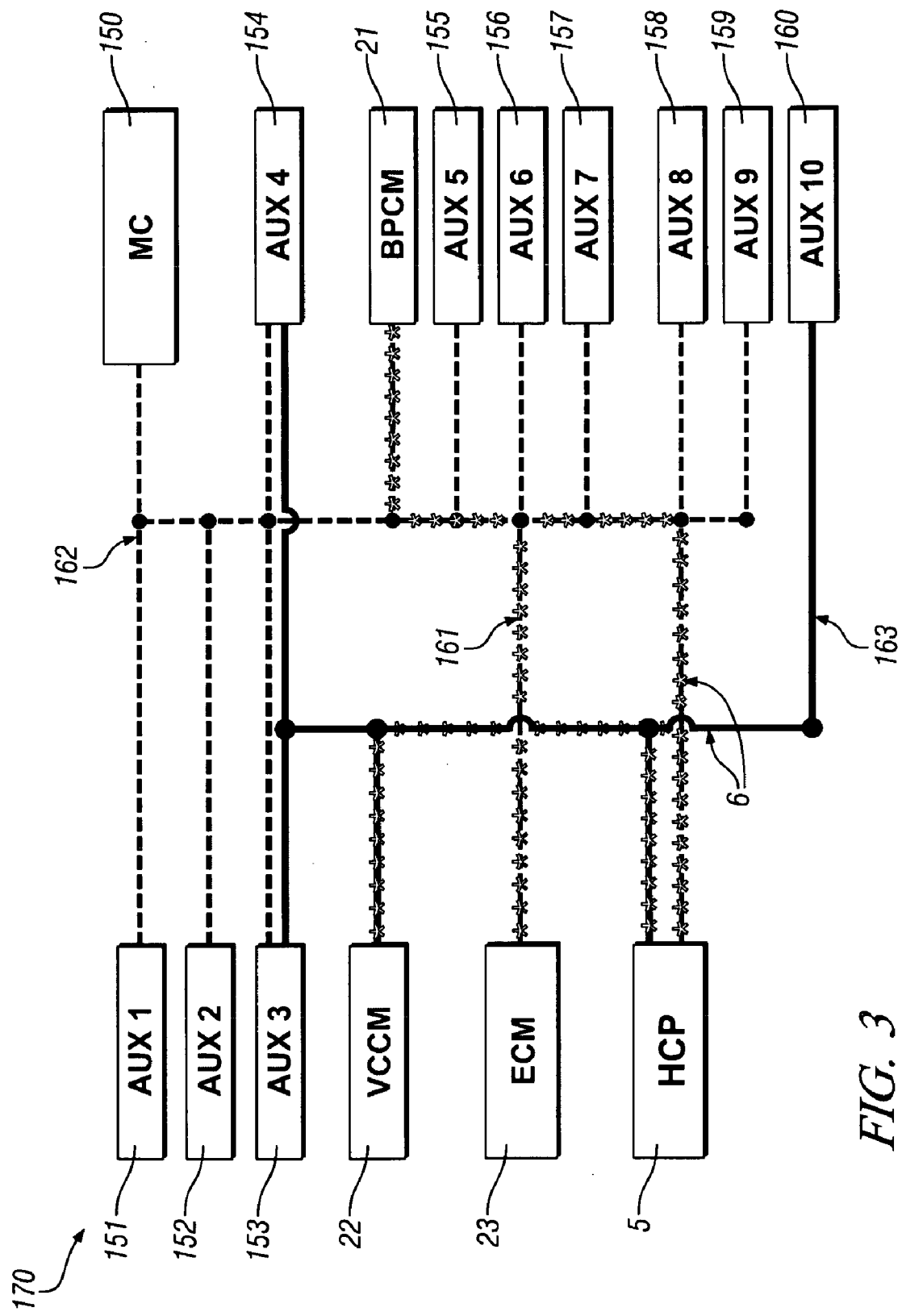
FIG. 3 is a schematic diagram of an exemplary overall control architecture, in accordance with the present disclosure.

In one embodiment the ELV 108 is a portable battery charger. In an alternative embodiment, the ELV 108 is a battery or a generator. In one embodiment, the ELV 108 is provided by another vehicle. In other alternative embodiments, the ELV 108 can be connected at other locations of the vehicle that are in electrical communication with the low voltage battery 106 or other locations of the powertrain Referring to FIG. 3, a schematic of the overall control architecture 300 of the vehicle is shown. The overall control architecture 300 includes control modules that communicate through the vehicle LAN 162, the hybrid LAN 163, and both the vehicle LAN 162 and the hybrid LAN 163. The master controller 150 provides coordination and control of the control modules when the vehicle is operating under the active operating mode.

Auxiliary control modules (AUX A 151, AUX B 152, AUX C 153, AUX D 154, AUX E 155, AUX F 156, AUX G 157, AUX H 158, AUX I 159, and AUX J 160) are not utilized by the HCP 5 during external charging. The auxiliary control modules can include control modules utilized during vehicle propulsion, and control module utilized to provide convenience features or user entertainment to a vehicle user. In one embodiment the auxiliary control modules includes the TCM 17. Along with the auxiliary control modules, other vehicle components are not active during the charging process and are herein referred to as auxiliary vehicle components. Auxiliary vehicle components include for example, an audio system, a climate control system (that is, air conditioning and heating system), an actuator (for example, a power window actuator or a power door lock actuator), or a resistance heating system (for example, a seat heating system or a defroster).

In order to conserve energy and maximize charging rate during the external charging mode, the auxiliary control modules enter a low-power mode in which a lower amount of power is utilized in the control modules than during an active operating mode, for example, an operating mode utilized during vehicle propulsion.

The HCP 5 actively establishes a virtual LAN 161 when the HCP 5 initiates an energy conservation mode during external charging. When the HCP 5 established the energy conservation mode, energy supply to the auxiliary vehicle components and auxiliary control modules is decreased. Further, the virtual LAN 161 is established between charging control modules of the hybrid electric vehicle thereby providing a charging control system. The charging control modules include control modules that are active during the charging process. In one embodiment the charging control modules include the VCCM 22, the BPCM 21, the HCP 5, and the ECM 23. The HCP 5 provides supervisory command to control of the VCCM 22, the ECM 23, and the BPCM 21. The virtual local area network (LAN) 161 allows for structured communication of states of operating parameters and command signals between the charging control modules when the vehicle is in the energy conservation mode.

Figure 4:
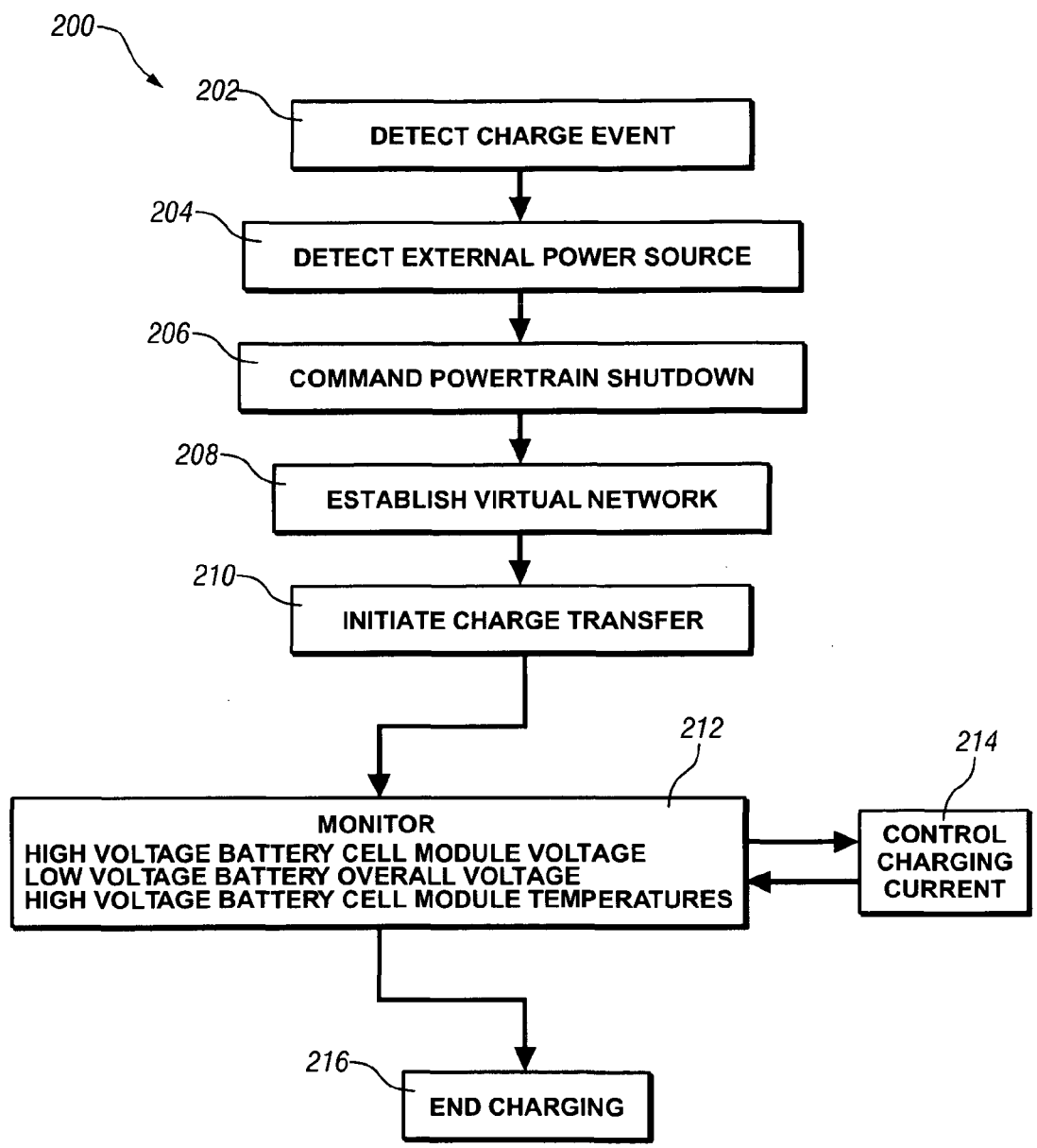
FIG. 4 is a flow chart diagram of a method of externally charging a hybrid electric vehicle, in accordance with the present disclosure.

Referring to FIG. 4, a method 200 for externally charging the powertrain. The method 200 charges the high voltage battery 102 of the powertrain while the vehicle is in the energy conservation mode.

The HCP 5 determines whether a charge event has been identified by checking the status of a charge variable. (202) The status of the charge variable is established by the HCP 5 by monitoring voltage levels and power levels of the high voltage battery 102, and determining whether the voltage level and power level is sufficient to start the engine 14 or whether a failed engine start can be attributed to insufficient voltage level or power level of the high voltage battery 102.

The HCP 5 determines whether the ELV 108 has been electrically coupled to the low voltage battery 106 (204). In particular, the HCP 5 monitors voltage of the low voltage battery 106 and detects an increase in voltage of the low voltage battery that is indicative of an external power source. In one embodiment, the HCP 5 detects whether an external power source is present by detecting whether the voltage level of the low voltage battery 106 is above 13 volts.

When the HCP 5 detects the presence of the ELV 108, the HCP 5 determines that the ELV 108 has been electrically coupled to the low voltage battery 106 and proceeds to step 206.

A vehicle user commands a powertrain shutdown (206). In one embodiment, the vehicle user commands the powertrain shutdown in response to a signal indicative of low charge. The signal indicative of low charge is sent by the HCP 5 to a visual display (not shown). In one embodiment, the vehicle user turns a key to an off position to command the powertrain shutdown. In one embodiment, the vehicle user presses a button to command the powertrain shutdown. When the powertrain shutdown is commanded, the vehicle begins to decrease power to vehicle components and to control modules that are either in an off state or a state that requires decreased amounts of power. However, various vehicle components receive power and remain operating for a selected period of time after the vehicle enters the shutdown mode. For example, when the vehicle enters the shutdown mode, the HCP 5 determines whether additional operations are required prior to initiating a shutdown. If no additional operations are required, the HCP 5 initiates shutdown fifteen seconds after the powertrain shutdown is commanded.

The HCP 5 establishes the virtual LAN 161 (208). In particular, the HCP 5 utilizes the communications architecture of the vehicle LAN 162 and the hybrid LAN 163 to establish communications through the virtual LAN 161 with the BPCM 21, VCCM 22, and the ECM 23. Further, the HCP 5 commands these processors to discontinue shutdown operations and remain active. For example, the HCP 5 commands the BPCM 21 to continue controlling and monitoring the high voltage battery 102 and to suspend any discharge procedures otherwise performed when the vehicle is in the shutdown mode.

The HCP 5 commands the VCCM 22 to begin current transfer from the low voltage bus 32 to the high voltage battery 102 (210). Initially, the VCCM 22 outputs power having about 0.5 amperes of electrical current to the high voltage battery. Electrical current is subsequently controlled at steps 212 and 214.

The HCP 5 monitors the voltage of the low voltage battery 106, the voltage of each cell module of the high voltage battery 102, and the temperature of each cell module of the high voltage battery 102 (212).

The HCP 5 controls charging current transferred to the high voltage battery 102 by the VCCM 22 (214). In one embodiment, the HCP 5 commands the VCCM 22 to increase the level of current transferred from the VCCM 22 to the high voltage battery 102 while monitoring the voltage level of the low voltage bus 22. The level of current transferred between ELV 108 and the low voltage battery 106 is increased until either a threshold current level is reached or until the voltage level of the low voltage bus decreases below a voltage threshold. In one embodiment, the HCP 5 maintains the voltage level of the low voltage bus 32 within a voltage range to provide a sufficient power level to run vehicle components utilized when performing the charging function (for example, the charging control modules). In one embodiment, the HCP 5 maintains the voltage level of the low voltage bus 32 within a range of 12.1 volts to 16.5 volts. An output current level from VCCM 22 to the high voltage battery is controlled to a maximum current within a selected range of while maintaining the voltage of the low voltage bus 32 within the selected range. In one embodiment, the output current level is controlled within a range of 0.5 amperes and 3.0 amperes.

Further, if a measured temperature level of any of the cell modules is above a threshold temperature, the charging is discontinued. In one embodiment, the threshold temperature of the cell modules is 60 degrees Celsius.

The HCP 5 discontinues charging and sends an output signal when a selected amount of power is transferred from the low voltage battery 106 and when an overall voltage level of the high voltage battery 102 is above a threshold (216).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of charging a powertrain including a low voltage battery and a high voltage battery, comprising:
   detecting an external power source in electrical communication with the powertrain based on a monitored voltage across the low voltage battery;
   concurrently establishing a virtual network between charging control modules that are active during said charging and decreasing energy supplied to auxiliary control modules that are not active during said charging; and
   transferring charge from the external power source through the low voltage battery of the powertrain to the high voltage battery of the powertrain.

2. The method of claim 1, further comprising:
   monitoring for the external power source in electrical communication with the powertrain; and
   establishing the virtual network between charging control modules when the external power source is detected.

3. The method of claim 1, further comprising:
   transferring charge from the external power source to the low voltage battery of the powertrain; and
   transferring charge from the low voltage battery to the high voltage battery of the powertrain.

4. The method of claim 1, further comprising commanding a powertrain shutdown wherein the virtual network is established after powertrain shutdown is commanded.

5. The method of claim 1, further comprising monitoring a temperature level of a battery of the powertrain and discontinuing charge transfer from the external power source to the powertrain when the monitored temperature level is above a threshold temperature.

6. The method of claim 1, further comprising monitoring a cell module voltage level of a cell module of a battery of the powertrain and controlling a current level supplied to the battery based on the cell module voltage level.

7. The method of claim 1, further comprising decreasing a power level to auxiliary vehicle components.

8. The method of claim 7, wherein the auxiliary vehicle components comprise at least one vehicle component selected from the group consisting of a climate control system, an actuator, an audio system, and a resistance heating system.

9. The method of claim 1, wherein the virtual network comprises a plurality of local area networks.

10. A method of charging a powertrain, comprising:
    detecting an external power source in electrical communication with a first battery of the powertrain based on a monitored voltage across the first battery;
    concurrently establishing a virtual network between charging control modules that are active during said charging and decreasing energy supplied to auxiliary control modules that are not active during said charging; and
    transferring charge from the external power source through the first battery to a second battery of the powertrain, the first battery comprising a low voltage battery and the second battery comprising a high voltage battery.

11. The method of claim 10, wherein first battery has a higher voltage than the second battery.

12. The method of claim 11, further comprising identifying a charge event.

13. The method of claim 11, wherein the virtual network is established after a powertrain shutdown is commanded.

14. The method of claim 10, further comprising converting voltage between the first battery and the second battery.

15. The method of claim 10 wherein the auxiliary control modules include a torque control module.

16. The method of claim 10, further comprising suspending power to auxiliary vehicle components.

17. The method of claim 16, wherein the auxiliary vehicle components comprise at least one vehicle component selected from the group consisting of a climate control system, an audio system, an actuator, and a resistance heating system.

18. A method of charging a powertrain including a low voltage battery and a high voltage battery, comprising:
    detecting an external power source in electrical communication with the powertrain based on a monitored voltage across the low voltage battery;
    commanding a shutdown of the powertrain;
    concurrently establishing a virtual network between charging control modules after the powertrain shutdown is commanded and decreasing energy supplied to auxiliary control modules that are not active during said charging; and
    transferring charge from the external power source through the low voltage battery of the powertrain to the high voltage battery of the powertrain.

* * * * *